United States Patent
Choi et al.

(10) Patent No.: US 9,262,988 B2
(45) Date of Patent: Feb. 16, 2016

(54) RADIO FREQUENCY INTERFERENCE REDUCTION IN MULTIMEDIA INTERFACES

(71) Applicant: Lattice Semiconductor Corporation, Portland, OR (US)

(72) Inventors: Hoon Choi, Mountain View, CA (US); Laurence A. Thompson, Morgan Hill, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/449,095

(22) Filed: Jul. 31, 2014

(65) Prior Publication Data

US 2015/0036756 A1    Feb. 5, 2015

Related U.S. Application Data

(60) Provisional application No. 61/861,927, filed on Aug. 2, 2013.

(51) Int. Cl.
*H04L 25/02*    (2006.01)
*G09G 5/00*    (2006.01)
*H04L 25/493*    (2006.01)

(52) U.S. Cl.
CPC ............ *G09G 5/006* (2013.01); *H04L 25/0266* (2013.01); *H04L 25/493* (2013.01); *H04L 25/0276* (2013.01)

(58) Field of Classification Search
CPC . H04N 19/00927; H04J 14/02; H05K 9/0058; H05K 9/00; H01R 13/6594; H01R 13/6596; H01R 12/724; H01R 13/658; H01R 13/6581; Y10S 439/939; G09G 5/006; H04L 9/065; H04L 25/0266; H04L 25/0276; H04L 25/493
See application file for complete search history.

(56) References Cited

U.S. PATENT DOCUMENTS

| | | | | |
|---|---|---|---|---|
| 7,339,502 | B2 * | 3/2008 | Furtner | G06F 13/4295 341/55 |
| 2003/0048852 | A1 * | 3/2003 | Hwang | H04L 1/0041 375/240.26 |
| 2006/0153572 | A1 * | 7/2006 | Champion | H04B 10/1143 398/140 |
| 2007/0200860 | A1 | 8/2007 | Kobayashi | |
| 2007/0257923 | A1 * | 11/2007 | Whitby-Strevens | 345/520 |
| 2008/0159414 | A1 * | 7/2008 | Brecher et al. | 375/258 |
| 2013/0151851 | A1 * | 6/2013 | Velasco et al. | 713/168 |
| 2013/0195218 | A1 * | 8/2013 | Whitby-Strevens | 375/296 |

OTHER PUBLICATIONS

PCT International Search Report and Written Opinion, PCT Application No. PCT/US2014/049304, Nov. 26, 2014, 14 pages.

* cited by examiner

*Primary Examiner* — Hirdepal Singh
(74) *Attorney, Agent, or Firm* — Fenwick & West LLP

(57) ABSTRACT

A device for communications over a multimedia communication interface. The device can be a source device including a scrambling circuit that receives control data associated with multimedia data to be transmitted over the multimedia channel of the multimedia communication interface, and generates scrambled control codes based on the control data. An encoding circuit generates transition minimized control codes based on the scrambled control codes. The device transmits the transition minimized control codes to a sink device via the multimedia channel. The sink device may also decode and de-scramble the transition minimized control codes received from the source device via the multimedia channel.

15 Claims, 6 Drawing Sheets

| Control Vector 435 | Transition Minimized Control Code 445 | Control Vector 435 | Transition Minimized Control Code 445 |
|---|---|---|---|
| 0 | 0000010111 | 1 | 1111101000 |
| 2 | 0000011011 | 3 | 1111100100 |
| 4 | 0000011101 | 5 | 1111100010 |
| 6 | 0000011110 | 7 | 1111100001 |
| 8 | 0000100111 | 9 | 1111011000 |
| 10 | 0000110011 | 11 | 1111001100 |
| 12 | 0000111001 | 13 | 1111000110 |
| 14 | 0000111100 | 15 | 1111000011 |
| 16 | 0001000111 | 17 | 1110111000 |
| 18 | 0001100011 | 19 | 1110011100 |
| 20 | 0001110001 | 21 | 1110001110 |
| 22 | 0001111000 | 23 | 1110000111 |
| 24 | 0010000111 | 25 | 1101111000 |
| 26 | 0011000011 | 27 | 1100111100 |
| 28 | 0011100001 | 29 | 1100011110 |
| 30 | 0011110000 | 31 | 1100001111 |

FIG. 5

RADIO FREQUENCY INTERFERENCE REDUCTION IN MULTIMEDIA INTERFACES

CROSS-REFERENCE TO RELATED APPLICATION

This application claims priority from U.S. Provisional Patent Application No. 61/861,927, titled "Radio Frequency Interference Reduction in Multimedia Interfaces" filed on Aug. 2, 2013, the contents of which are incorporated by reference herein in their entirety.

BACKGROUND

1. Field of the Disclosure

This disclosure pertains in general to data communications, and more specifically to radio frequency interference reduction in multimedia interfaces.

2. Description of the Related Art

Different types of multimedia data are often transmitted from a source device to a sink device over a cable, such as a HDMI cable that uses differential signaling. The information transmitted across the cable is often repetitive in nature, which causes unwanted electro-magnetic interference (EMI). To address the EMI, video data can be encoded with transition minimized differential signaling (TMDS) to minimize transitions and create DC balance in the video data. However, as HDMI bandwidths increase and wireless services expand, further EMI reduction is necessary.

SUMMARY

Embodiments of the present disclosure are related to devices for communications over a multimedia communication interface, such as a source device that transmits multimedia content to a sink device over a multimedia communication interface. In one embodiment, the source device includes a scrambling circuit that receives control data associated with multimedia data to be transmitted over the multimedia channel of the multimedia communication interface, and generates scrambled control codes based on the control data. For example, the control data received by the scrambling circuit has a first number of bits. The scrambling circuit generates the scrambled control codes by first generating, based on the control data, expanded control codes having a second number of bits that are greater than the first number of bits. The scrambling circuit retrieves random numbers or portions of random numbers from a random number generator included in the hardware component, and generates the scrambled control codes by scrambling the expanded control codes and the random numbers or portions of random numbers. In one example, the expanded control codes are generated by the scrambler circuit based on bit sequence representing one or more multimedia channels included in the multimedia communication interface.

In one embodiment, the hardware component included in the source interface device also includes an encoding circuit to generate transition minimized control codes based on the scrambled control codes. In one example, the encoder circuit generates the transition minimized control codes based on a disparity value indicating a disparity between a number of 0's and number of 1's transmitted in previous transition minimized control codes. In another example, the encoder circuit generates the transition minimized codes by selecting the transition minimized codes from a plurality of pre-determined transition minimized codes. The source interface device transmits the transition minimized control codes to a sink interface device via the multimedia channel. In one embodiment, the source interface device transmits the transition minimized codes via the multimedia channel in a first mode, and in a second mode transmits transition maximized versions of the control data via the multimedia channel.

In one embodiment, the sink interface device includes a decoder circuit and a de-scrambler circuit for decoding and de-scrambling transition minimized control codes received from the source interface device via the multimedia channel. In one example, the decoder circuit decodes transition minimized control codes received via the multimedia channel of the multimedia communication interface. The decoding circuit decodes the transition minimized control codes to generate scrambled control codes. The de-scrambler circuit generates control data associated with multimedia data based on the scrambled control codes. For example, the de-scrambler circuit generates control data by de-scrambling the scrambled control codes into intermediate control codes having a first number of bits, and generates the control data having a second number of bits less than the first number of bits based on the intermediate control codes. The de-scrambler circuit de-scrambles the scrambled control code based on the scrambled control codes and random numbers generated by a random number generator included in the control device.

In one embodiment, the decoder circuit generates the scrambled control codes by referencing the transition minimized control codes to a look up table that includes a plurality of pre-determined transition minimized control codes. In one example, the sink interface device receives transition minimized codes in a first mode, and in a second mode receives transition maximized versions of the control data via the multimedia channel. The sink interface device decodes and de-scrambles the transition maximized versions of the control data. In one example, the control data corresponds to display synchronization information. In another example, the control data describes the multimedia data that is to follow the control codes.

BRIEF DESCRIPTION OF THE DRAWINGS

The teachings of the embodiments disclosed herein can be readily understood by considering the following detailed description in conjunction with the accompanying drawings.

FIG. 5 is a look up table including different control vectors and the corresponding transition minimized control codes, according to one embodiment.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Figure 1:
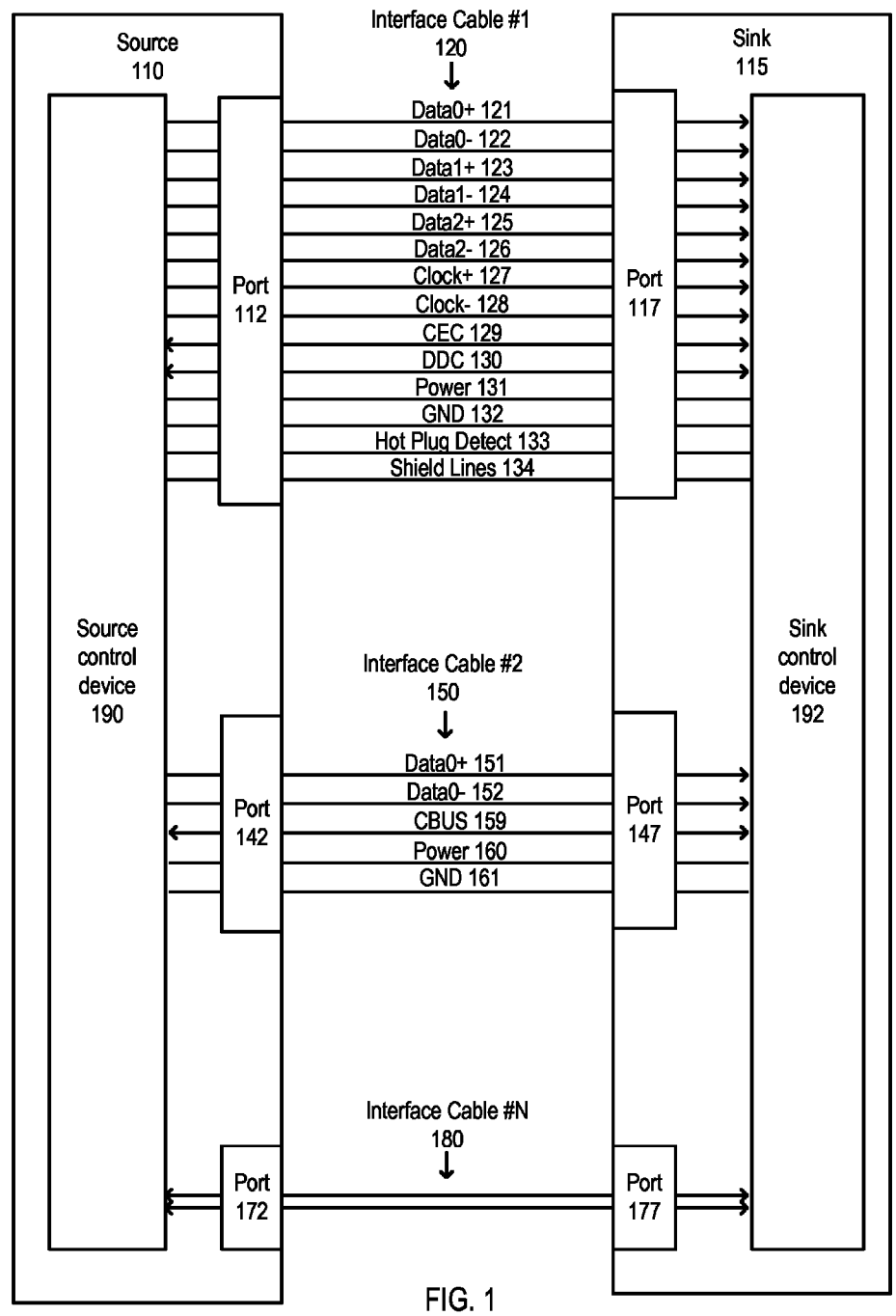
FIG. 1 is a high-level block diagram of a system for data communications, according to one embodiment.

FIG. 1 is a high-level block diagram of a system 100 for data communications, according to one embodiment. The system 100 includes a source device 110 communicating with a sink device 115 through one or more interface cables 120, 150, 180. Source device 110 transmits multimedia data streams (e.g., audio/video streams) and control data associated with the multimedia data streams to the sink device 115 through the interface cables 120, 150, 180. In one embodiment, source device 110 and/or sink device 115 may be repeater devices.

Source device 110 includes physical communication ports 112, 142, 172 coupled to the interface cables 120, 150, 180. Sink device 115 also includes physical communication ports 117, 147, 177 coupled to the interface cables 120, 150, 180. Signals exchanged between the source device 110 and the sink device 115 across the interface cables pass through the physical communication ports.

Source device 110 and sink device 115 exchange data using various protocols. In one embodiment, interface cable 120 represents a High Definition Multimedia Interface (HDMI) cable. The HDMI cable 120 supports differential signals transmitted via data0+ line 121, data0− line 122, data1+ line 123, data1− line 124, data2+ line 125, and data2− line 126. Each differential pair of lines forms a logical communication channel that carries multimedia data streams. The HDMI cable 120 may further include differential clock lines clock+ 127 and clock−128; Consumer Electronics Control (CEC) control bus 129; Display Data Channel (DDC) bus 130; power 131, ground 132; hot plug detect 133; and four shield lines 134 for the differential signals. In some embodiments, the sink device 115 may utilize the CEC control bus 129 for the transmission of closed loop feedback data to source device 110.

In one embodiment, interface cable 150 represents a Mobile High-Definition Link (MHL) cable. The MHL cable 150 supports differential signals transmitted via data0+ line 151 and data0− line 152, which form a single logical communication channel for carrying multimedia data streams. In some embodiments of MHL, there may be more than a single pair of differential data lines. In some versions of MHL, embedded common mode clocks are transmitted through the differential data lines. The MHL cable 150 may further include a control bus (CBUS) 159, power 160 and ground 161. The CBUS 159 carries data such as discovery data, configuration data and remote control commands.

The source device 110 includes a source control device 190 and the sink device 115 includes a sink control device 192. Examples of source control device 190 and sink control device 115 are integrated circuits (ICs) or other types of devices. The source control device 190 may include a transmitter or a source interface device that processes multimedia data streams and outputs signals for the multimedia data streams across the interface cables 120, 150, 180 to the sink control device 192. The sink control device 192 may include a receiver or sink interface device that receives the multimedia data streams and prepares the multimedia data streams for display.

In one embodiment, a representation of the source device 110, the sink device 115, or components within the source device 110 or sink device 115 may be stored as data in a non-transitory computer-readable medium (e.g. hard disk drive, flash drive, optical drive). These descriptions may be behavioral level, register transfer level, logic component level, transistor level and layout geometry-level descriptions.

Embodiments of the present disclosure relate to a system that scrambles and encodes control data for transmission across the differential pairs of an interface cable such as an HDMI cable 120 during control periods. Each differential pair represents a single multimedia communication channel. The control data is scrambled and encoded to minimize electro-magnetic interference (EMI) and radio-frequency interference (RFI) while transmitting the data across the HDMI cable 120.

Figure 2:
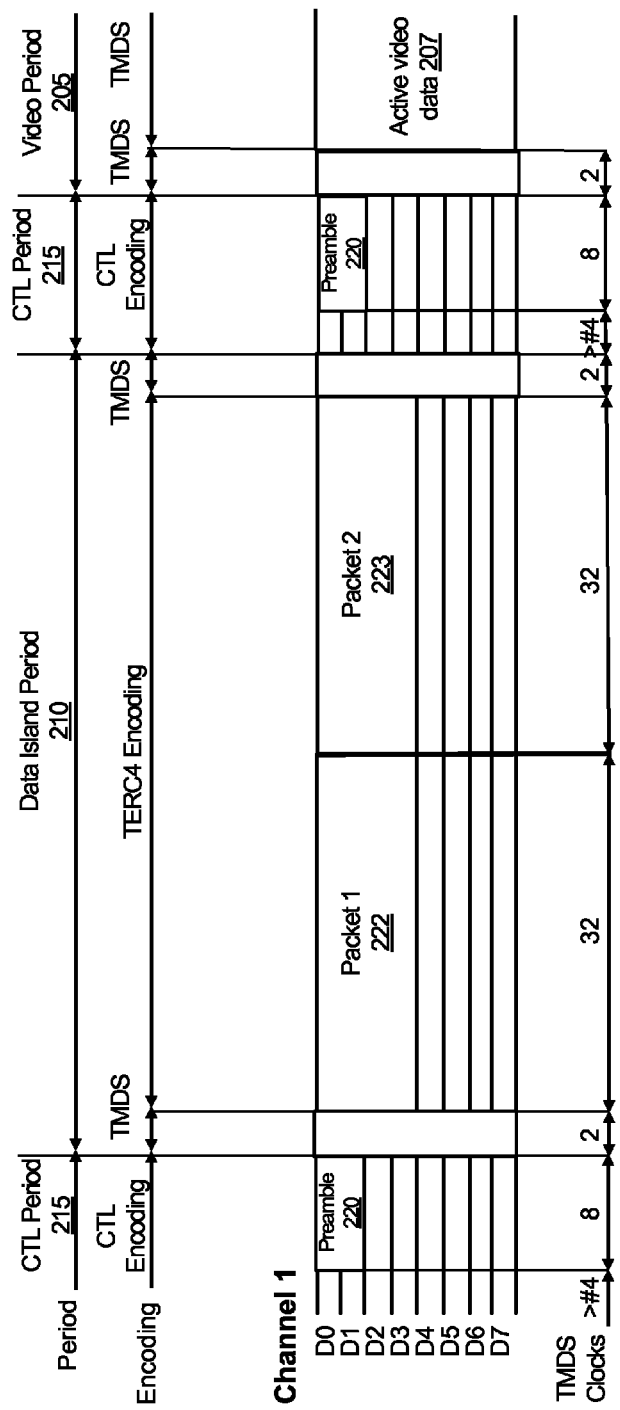
FIG. 2 is an example of different types of data transmitted by the source device and encoded differently during different data periods for transmission over an HDMI channel, according to one embodiment.

FIG. 2 is an example of different types of data transmitted by the source interface device 302 and encoded differently during different data periods for transmission over an HDMI channel, according to one embodiment. The operation of the source interface device 302 can be divided into three different periods of time: the control period 215, the data island period 210, and the video data period 205. During these periods of time, the source interface device 302 receives up to 8 bit data values (D0-D7) in each clock cycle to be transmitted over channel 1 as 10 bit codes.

There are two control periods 215 in FIG. 2. A control period 215 precedes each data island period 210, and a control period 215 also precedes each video period 205. During the control periods 215, the source interface device 302 processes and transmits control data. In one example, the control data corresponds to display synchronization information, such as vertical synchronization and horizontal synchronization data for video frames transmitted by the source interface device 302 to the sink interface device 304. In another example, control data includes information describing the data following the control data. Specifically, the source interface device 302 processes and transmits control data representing a preamble 220. The preamble 220 is a sequence of eight identical 2-bit control characters identifying whether the data following the control data is video data or data island data. The preamble 220 is scrambled and converted into transition minimized control codes by the source interface device 302 as further described in conjunction with FIG. 3 and FIG. 4 below.

Control data can be very repetitive in nature and requires frequent repeated transmission of the same value. The repetitive nature of control data tends to increase electro-magnetic interference (EMI) or the radio frequency interference (RFI) when compared to other types of data. Thus, by scrambling and encoding control data, as described in conjunction with FIG. 3 and FIG. 4 below, a significant reduction in EMI and RFI can be achieved. In particular the selection of a transition minimized control codes from a large set of transition minimized control codes based on the result of expanding and scrambling the control data contributes to EMI and RFI reduction.

During the data island period 210, the source interface device 302 processes and transmits data island data. Data island data includes auxiliary data and guard band data. The auxiliary data can include audio data associated with the active video data. The auxiliary data may also include InfoFrames, other information describing the active audio or video stream or other information describing the source interface device 302. The auxiliary data is transmitted using packets 222 and 223. Each packet 222 and 223 can include packet data and a header describing the type of the packet data (i.e. audio packet, null packet, InfoFrame packet). In one embodiment, the packets 222 and 223 are scrambled and TERC4 (transition minimized differential signaling error reduction coding) encoded prior to being transmitted.

Also during the data island period 210, guard band data is transmitted either prior to the auxiliary data packets 222 and 223 to provide a transition to the auxiliary data packets 222 and 223, or trailing the auxiliary data packets 222 and 223 to provide a transition away from the auxiliary data packets 222 and 223. The guard band data also acts as a buffer to prevent the interference between data transmitted before or after the data island data and the data island data. In one embodiment, the guard band data are encoded using a transition minimized differential signaling (TMDS) algorithm.

During the video period 205, the source interface device 302 processes and transmits video data. The video data includes leading guard band data and active video data 207. The leading guard band data provides a transition between the second control period 215 and the video period 205. The active video data 207 includes video pixel information describing the color levels of pixels to be displayed on a display device, such as the sink interface device 304. In one embodiment, the leading guard band data as well as the active video data are both scrambled and then TMDS encoded.

Figure 3:
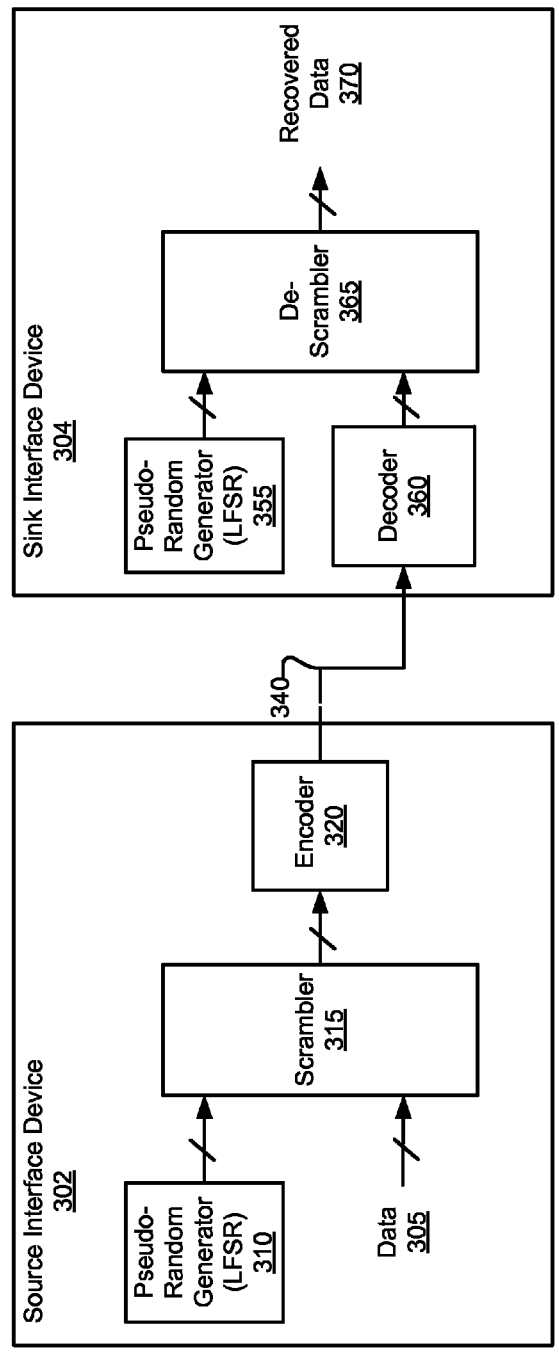
FIG. 3 is a block diagram of source interface device and a sink interface device, according to one embodiment.

FIG. 3 is a block diagram of source interface device and a sink interface device, according to one embodiment. In one embodiment, an HDMI cable carries four differential pairs that constitute 3 multimedia communication channels (channel 0, channel 1, and channel 2) and a clock channel. The 3 multimedia communication channels are used to carry video data, data island data and control data. The source interface device 302 transmits video data, data island data and control data via the 3 data channels. Only the circuitry for communicating over a single HDMI channel 1 (i.e. data lines 123 and 124) is shown in FIG. 3. The circuitry for communicating over the remaining HDMI channels may be substantially similar to the circuitry shown in FIG. 3.

The source interface device 302 scrambles and encodes data 305, and transmits the encoded data via an HDMI channel 340 to the sink interface device 304. In one embodiment, the source interface device 302 includes a pseudo-random generator 310, a scrambler 315 and a encoder 320. These components may be implemented with circuits.

The pseudo-random generator 310 generates a pseudo-random number. In one example, the pseudo-random number generator 310 is a linear feedback shift register (LFSR).

The scrambler 315 scrambles the data 305 by using all or a portion of the pseudo-random number generated by the pseudo-random generator 310. As described above, the data 305 could be video data, data island data or control data. Scrambling the data 305 reduces EMI or the RFI generated while transmitting the data 305. The scrambler 315 may apply a variety of techniques to generate scrambled data. In one example, the scrambler 315 generates scrambled data by performing an XOR operation between the data 305 and the pseudo-random number generated by the pseudo-random generator 310, as is further described in conjunction with FIG. 4 below. The scrambled data is then sent to the encoder 320.

The encoder 320 generates transition minimized and direct current (DC) balanced codes from the scrambled data generated by the scrambler 315. The encoder 320 encodes the scrambled data to further reduce EMI and RFI, thereby generating encoded 10 bit character codes at the output of the encoder 320. In one embodiment, the encoder 320 encodes portions of the scrambled data that correspond to (1) guard bands and (2) active video data using a transition minimized differential signaling (TMDS) algorithm. In other examples, the encoder 320 may encode other portions of the scrambled data that correspond to other types of data (e.g. auxiliary data, control data) using TMDS.

In another embodiment, the encoder 320 encodes scrambled auxiliary and audio data (data island packet data) into TMDS error reduction (TERC4) codes. TERC4 codes are generated by mapping 4-bit values in the scrambled auxiliary and audio data into pre-determined 10-bit codes.

In one embodiment, the encoder 320 encodes 2-bit values in the control data into 10-bit control codes. The control codes are DC balanced and may or may not be transition minimized. In one example, the encoder 320 uses a disparity value to achieve a DC balance while generating control codes. One example process for generating transition minimized and DC balanced control codes is described with respect to FIG. 4 below. In one embodiment, the source interface device 302 generates transition maximized control codes to transmit to legacy sink interface devices 304 that are not capable of processing transition minimized control codes, as is further described in conjunction with FIG. 4 below.

In one embodiment, the source interface device 302 includes an interface circuit (not shown) that receives the encoded codes from the encoder 320. The interface serializes the encoded codes and transmits differential signals for the encoded codes across HDMI channel 340 to the sink interface device 304. The interface may use current mode logic to transmit the differential signals.

The sink interface device 304 decodes and de-scrambles the transition minimized control data received from the source interface device 302 via the HDMI channel 340. In one embodiment, the sink interface device 304 includes a pseudo-random generator 355, a de-scrambler 365 and a decoder 360. These components may be implemented with circuits.

The pseudo-random generator 355 generates a pseudo-random number. In one example, the pseudo-random generator 355 is a linear feedback shift register (LFSR).

In one embodiment, the pseudo-random generator 355 in the sink interface device 304 is synchronized with the pseudo-random generator 310 in the source interface device 302. The synchronization of the two pseudo-random generators 310 and 355 helps the sink interface device 304 accurately and efficiently de-scramble the scrambled transition minimized codes received from the source interface device 302. In one example, both pseudo-random generators 310 and 355 are initialized to the same state at the same time, and once their states are initialized both pseudo-random generators 310 and 355 are advanced the same amount per transmitted character. In one example, the synchronization of the pseudo-random generators 310 and 355 is achieved by the periodic transmission of a sequence of control codes. In one example, the sequence of control codes for synchronization is a DC balanced transition maximized sequence of control codes transmitted from the source interface device 302 to the sink interface device 304 once per video frame.

The decoder 360 decodes the transition minimized and DC balanced data received from the source interface device 302 to retrieve the scrambled data generated by the scrambler 315. In one embodiment, the decoder 360 uses TMDS to decode portions of the transition minimized data, such as portions corresponding to (1) guard bands and (2) active video data. In another embodiment, the decoder 620 decodes TERC4 codes received from the source interface device 302. The decoder decodes TERC4 codes by mapping the 10-bit codes to pre-determined 4-bit values representing auxiliary and audio data. In one embodiment, the decoder 360 decodes 10-bit long transition minimized control codes into 2-bit values representing the recovered control data, as is further described in conjunction with FIG. 6 below.

The de-scrambler 365 de-scrambles the scrambled data received from the decoder 360 by using all or a portion of the pseudo-random number generated by the pseudo-random generator 355. As described above, the de-scrambler 365 is likely to use the same portion of the same pseudo-random number generated by both pseudo-random generators 310 and 355 to accurately de-scramble the scrambled data. The de-scrambler 365 may apply a variety of techniques to de-scramble the scrambled data to generate recovered data 370. In one example, the de-scrambler 365 generates recovered data by performing an XOR operation between the scrambled data 305 and the pseudo-random number generated by the pseud-random generator 355, as is further described in conjunction with FIG. 6 below. Typically, the recovered data 370 matches the data 305 that was scrambled and transition minimized by the source interface device 302.

In one embodiment, the sink interface device 304 includes an interface circuit (not shown) that deserializes received codes before they are provided to the decoder 360.

Figure 4:
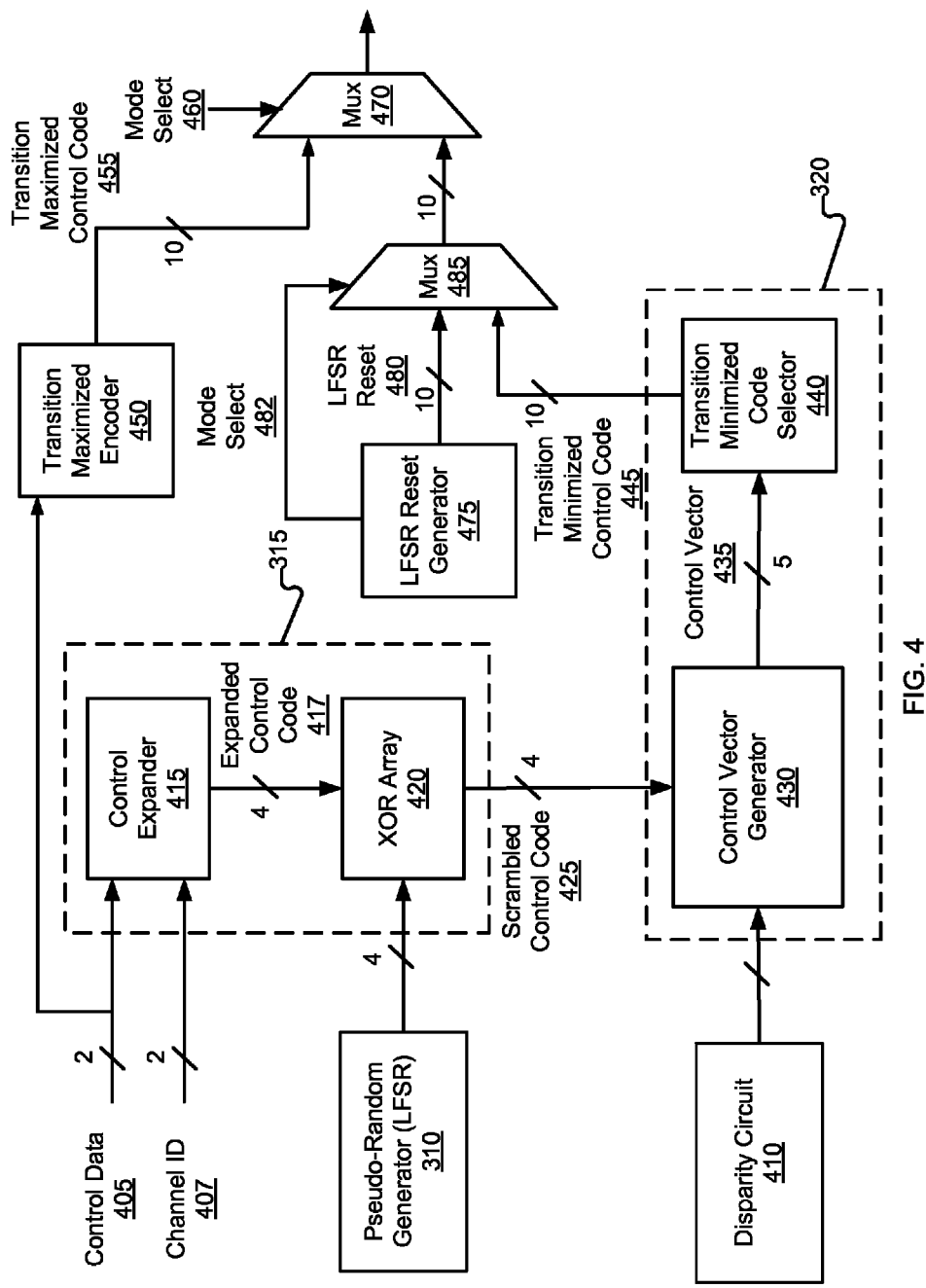
FIG. 4 is a block diagram of a scrambler and a encoder of the source interface device generating transition minimized and transition maximized control codes, according to one embodiment.

FIG. 4 is a block diagram of a scrambler 315 and a encoder 320 of the source interface device generating transition minimized and transition maximized control codes, according to one embodiment. Note that FIG. 4 represents the operations of the scrambler 315 and the encoder 320 with respect to control data 405 only, as opposed to video data or data island data.

In the example of FIG. 4, the scrambler 315 receives 2-bits of control data 405. The control data 405 includes a series of 2 bit control characters/codes. In HDMI, the control data 405 varies by channel. For example, the control data 405 for channel 0 includes a HSYNC bit and a VSYNC bit, the control data 405 for channel 1 includes CTL0 and CTL1 bits, and the control data 405 for channel 2 includes CTL2 and CTL 3 bits.

In one embodiment, the scrambler 315 includes a control expander 415 and an XOR array 420. The control expander 415 generates a 4-bit expanded control code 417 based on the control data 405 and a channel ID 407. In on embodiment, the control expander 415 generates 4-bits of the expanded control code by adding the 2-bits of Channel ID to the 2-bit control data 405. The channel ID 407 specifies the HDMI channel that the control data 405 will be transmitted across. If the control data 405 is associated with HDMI channel 0, the control expander receives a channel ID 407 that includes 2 logic low bits, or "0" bits, to combine with the 2-bit control data 405. If the control data 405 is for HDMI channel 1, the control expander 415 receives a channel ID 401 that includes a 2 bit sequence of "01" to add to the 2 bit control data 405. If the control data 405 is for HDMI channel 2, the control expander 415 receives a channel ID that includes a 2 bit sequence of "10" to add to the 2 bit control data 405. For example, since the circuitry in FIG. 4 is for channel 1, 2 bit control data 405 of "00" may be combined with a 2 bit channel ID including the sequence of "01" to generate an expanded control code of "0001."

The XOR array 420 combines the 4-bits of the expanded control code 417 generated by the control expander 415 with 4-bits of a pseudo-random number generated by the pseudo-random generator 310. In one embodiment, the 4-bits of the pseudo-random number used by the XOR array 420 are a portion of the pseudo-random number generated by the pseudo-random generator 310. For example, the pseudo-random generator 310 generates a pseudo-random number that is 15-bits long. The XOR array may XOR the $11^{th}$ through $14^{th}$ bits of the 15-bit long pseudo-random number with the expanded control code 417 to generate a scrambled control code 425.

By performing an XOR operation on the expanded control code 417 with a pseudo-random number, the scrambler 315 scrambles the expanded control code 417 thereby reducing the RFI and EMI generated while transmitting the scrambled control codes 425. Additionally, expanding the control data 405 from 2 bits to 4 bits expanded control codes 417 increases the number of possible combinations produced by the XOR array 420 to increase the effectiveness of the scrambling.

Encoder 320 generates transition minimized control codes 445 based on the scrambled control codes 425 generated by the scrambler 315. In one embodiment, the encoder 320 includes a control vector generator 430 and a transition minimized code selector 440. The control vector generator 430 generates a control vector based on the scrambled control code 425 and a disparity value generated by a disparity circuit 410. An example of a disparity circuit 410 is a register capable of storing a digital value. The disparity circuit 410 monitors the disparity between the number of "0"s (i.e. logic low bits), and the number of "1"s (i.e. logic high bits) in previously transmitted transition minimized codes 445 and stores a disparity value indicating the disparity between "0"s and "1"s in one or more previously transmitted transition minimized codes 445.

The control vector generator 430 generates a 5-bit long control vector 435 based on the scrambled control code 425 and the disparity value provided by the disparity circuit 410. In one example, the control vector generator 430 selects the 4-bits of the scrambled control code 425 as the $5^{th}$ through $2^{nd}$ bits of the control vector 435. The control vector generator 430 determines the $1^{st}$ bit of the control vector 435 using the disparity value. For example, if the disparity value is greater than 0, the control vector generator 430 sets the $1^{st}$ bit of the control vector 435 to 0. The control vector generator 430 may also reset the disparity value to 0 to keep the disparity value up to date. Similarly, if the disparity value is less than 0, the control vector 430 sets the $1^{st}$ bit of the control vector 435 to 1. The control vector generator 430 may also reset the disparity value to 1 to keep the disparity value up to date. If the disparity value is 0, the control vector generator 430 sets the $1^{st}$ bit of the control vector 435 to equal the $15^{th}$ bit of the pseudo-random number.

The transition minimized code selector 440 selects a transition minimized code 445 to transmit based on the control vector 435 generated by the control vector generator 430. In one example, as the control vector 435 is 5-bits long, the transition minimized code selector 440 selects a 10-bit long transition minimized code 445 from a look up table that includes 32 different pre-determined transition minimized codes 445 using the value represented by the 5-bit long control vector 435. FIG. 5 shows an example look up table including a decimal value represented by a control vector 435 and the corresponding transition minimized control code 445. For example, the transition minimized code selector 440 selects the 10-bit long transition minimized control code 445 "0000010111" based on the control vector 435 representing the value 0. The codes are transition minimized because they represent a sub-set of possible 10 bit codes having six "0"s and four "1"s or four "0"s and six "1"s while having a reduced number of bit transitions.

Returning now to FIG. 4, the source interface device 302 may also generate transition maximized control codes 455 to be compatible with legacy sink interface devices 304 that are not capable of processing transition minimized control codes 445. A transition maximized encoder 450 generates transition maximized control codes 455 from the control data 405. As the control codes 405 are 2-bits long, the transition maximized encoder 450 selects 1 of 4 DC balanced and transition maximized control codes 455 based on the 2-bit long control code 405. For example, the transition maximized encoder 450 identifies the 2-bit long control code in a look up table and selects the corresponding transition maximized control code 455. Examples of transition maximized control codes 455 include "1101010100," "0010101011," "0101010100," or "1010101011." Each of these example transition maximized control codes 455 includes 7 or 8 transitions. A transition is a change from 0 to 1 or from 1 to 0 as you move from left to right through each code.

An LFSR reset generator 475 generates a 10-bit LFSR reset 480 control code. The LFSR reset 480 control codes initializes the pseudo-random generator 355 included in the sink interface device 304 to the same state as that of the pseudo-random generator 310 of the source interface device 302, thereby synchronizing the two pseudo-random generators. In one example, the LFSR reset 480 control codes are DC balanced and transition maximized control codes. The LFSR reset 480 control codes are transmitted periodically, once per video frame for example, from the source interface device 302 to the sink interface device 304, as the source interface device 302 transmits transition minimized control codes 445 to the sink interface device 304.

A multiplexer 485 receives the transition minimized control code 445 and the LFSR reset 480 control code. The multiplexer 485 selects between the transition minimized control code 445 and the LFSR reset 480 control code based on a mode select 482 value received from the LFSR reset generator 475. The mode select value 482 is generated by the LFSR reset generator 475 based on whether the LFSR reset generator 475 has generated an LFSR reset 480 control code to transmit to the sink interface device 304. Thus, the multiplexer 485 typically selects the transition minimized control code 445 to transmit to the sink interface device 304, and periodically selects the LFSR reset 480 control code based on the mode select 482 received from the LFSR reset generator 475.

A multiplexer 470 receives the output of the multiplexer 485 (the transition minimized control code 445 or the LFSR reset 480 control code) and the transition maximized control code 455. The multiplexer 470 selects between the transition maximized control code 455 and the output of the multiplexer 485 based on a mode select 460 value. The mode select value 460 may be determined based on the capabilities of the sink interface device 304, as determined by the source interface device 302 through communications through the display data channel 130. If the sink interface device 304 is a legacy device that is incapable of processing transition minimized control codes 445, the mode select value 655 is set such that the multiplexer selects transition maximized control codes 455 to transmit to the sink interface device 304. Alternatively, if the sink interface device 304 is capable of processing transition minimized control codes 445, the mode select value 655 is set such that the multiplexer selects the output of the multiplexer 485, which is either a transition minimized control code 445 or a LFSR reset 480 control code, to transmit to the sink interface device 304.

Figure 6:
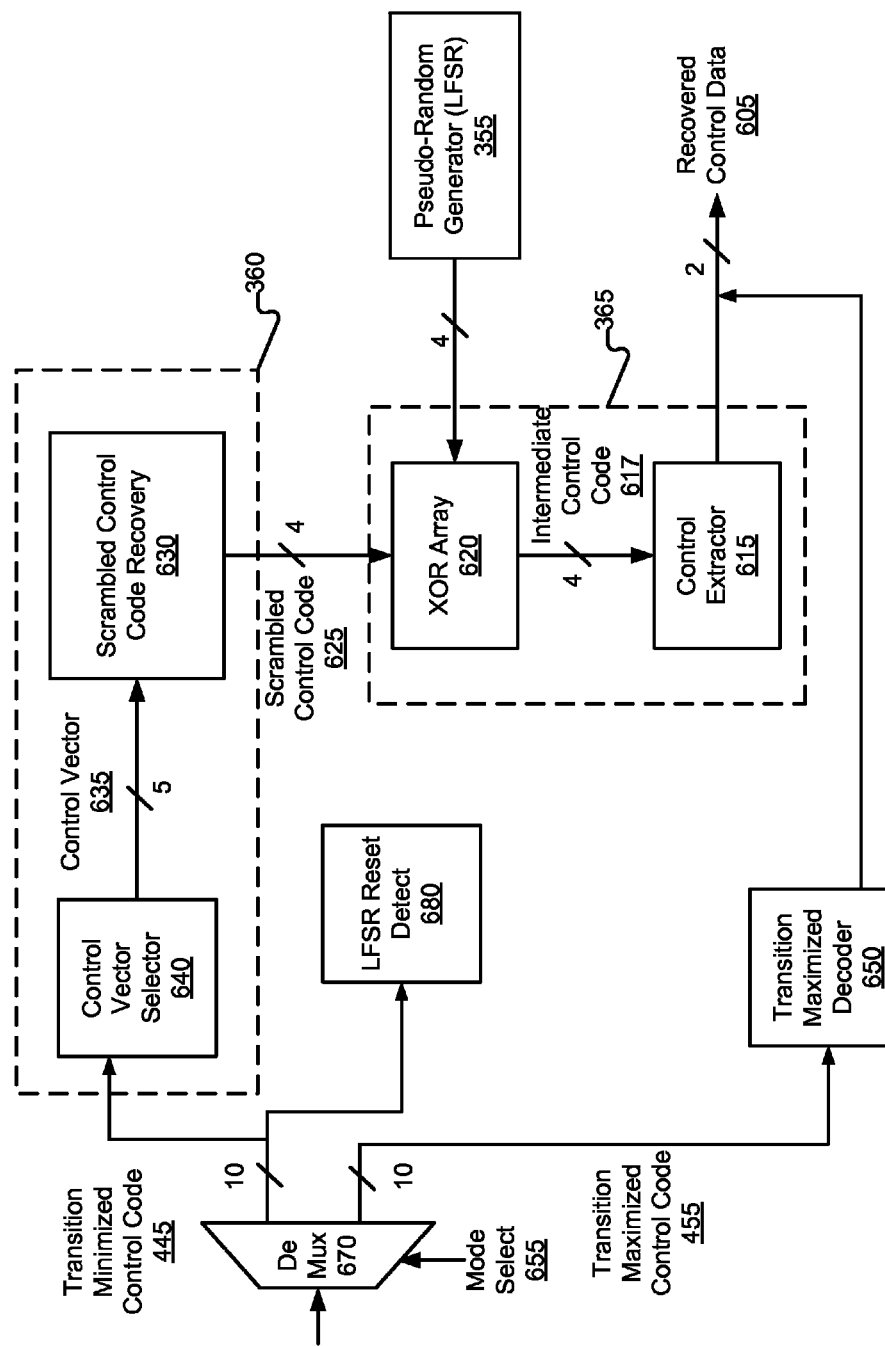
FIG. 6 is a block diagram of a de-scrambler and a transition minimized decoder of the sink interface device for decoding and de-scrambling transition minimized control codes and transition maximized control codes, according to one embodiment.

FIG. 6 is a block diagram of a de-scrambler 365 and a decoder 360 of the sink interface device 304 for decoding and de-scrambling transition minimized control codes and transition maximized control codes, according to one embodiment. Note that FIG. 6 represents the operations of the de-scrambler 365 and the decoder 360 with respect to transition minimized control codes only.

The sink interface device 304 receives either transition minimized control codes 445 or transition maximized control codes 455 from the source interface device 302. In one embodiment, the sink interface device 304 includes a de-multiplexer 670 to select between different processing modes associated with processing either the transition minimized control codes 445 or the transition maximized control codes 455. The mode select value 655 may be set in accordance with the capabilities of the source interface device 302, as determined by the sink interface device 304 through communications through the display data channel 130 or another sideband channel.

In one embodiment, an LFSR reset detect 680 block determines from the control codes received when the sink interface device 304 is processing transition minimized codes 445 whether a control code is an LFSR reset 480 control code. On detecting that a received control code is an LFSR reset 480 control code the LFSR reset detect 680 resets the pseudo-random generator 355 to the same state as the pseudo-random generator 310 of the source interface device 302, thereby synchronizing the two pseudo-random generators.

The decoder 360 decodes the 10-bits of transition minimized control code 445 received from the source interface device 302 and generates a scrambled control code 625. In one embodiment, the decoder 360 includes a control vector selector 640 and a scrambled control code recovery block 630. The control vector selector 640 selects a control vector 635 based on the transition minimized control code 445. In one example, the control vector selector 640 selects a 5-bit long control vector 635 from a look up table including 32 different pre-determined transition minimized codes 445 and their corresponding pre-determined control vectors. The control vector selector 640 references the transition minimized code 445 to the table, and selects the corresponding control vector 635 from the table. An example of a look up table is shown in FIG. 5.

The scrambled control code recovery block 630 generates a 4-bit long scrambled control code 625 from the control vector 635 selected by the control vector selector 640. In one example, the scrambled control code recovery block 630 uses 4-bits of the 5-bit long control vector 635 as the 4-bit long scrambled control code 625. For instance, the scrambled control code recovery block 630 selects the $5^{th}$ through $2^{nd}$ bits of the control vector 635 to be the scrambled control code 625 and discards the $1^{st}$ bit of the control vector 635.

The de-scrambler 365 de-scrambles the scrambled control code 625 to generate 2-bit recovered control data 605. In one embodiment, the de-scrambler 365 includes an XOR array 620 and a control extractor 615. The XOR array 620 de-scrambles the scrambled control code 625 with an XOR of the 4-bits of the scrambled control code 625 with 4-bits of a pseudo-random number generated by the pseudo-random generator 355. In one embodiment, 4-bits of the pseudo-random number used by the XOR array 620 are a portion of the pseudo-random number generated by the pseudo-random generator 355. For example, the pseudo-random generator 355 generates a pseudo-random number that is 15-bits long. The XOR array 620 may combine the $11^{th}$ through $14^{th}$ bits of the 15-bit long pseudo-random number with the scrambled control code 625 to generate a 4-bit long intermediate control code 617 (the counterpart of expanded control code 417 in FIG. 4).

The control extractor 615 extracts the 2-bit long recovered control data 605 from the 4-bit long intermediate control code 617 generated by the XOR array 620. In one embodiment, the control extractor 615 uses 2-bits of the 4-bits of the intermediate control code 617 as the 2-bits of the recovered control data 605. In one example, the control extractor 615 selects the $3^{rd}$ and $4^{th}$ bits of intermediate control code 617 to be the recovered control data 605 while stripping away the $1^{st}$ and $2^{nd}$ bits.

In a legacy mode where the sink interface device 304 receives transition maximized control codes 455, a transition maximized decoder 650, decodes the transition maximized control code 455 to generate the recovered control data 605. In one embodiment, the transition maximized decoder 650 selects 1 of 4 possible recovered control data 605 values from a look up table based on the received transition maximized control codes 455.

Upon reading this disclosure, those of skill in the art will appreciate still additional alternative designs for a system that scrambles and encodes control data for transmission across the differential pairs of an interface cable such as an HDMI cable 120. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A device for communications over a multimedia communication interface having a plurality of multimedia channels, comprising:
 a random number generator to generate random numbers;
 a scrambler circuit to receive control data associated with multimedia data to be transmitted over a multimedia channel of the plurality of multimedia channels of the multimedia communication interface, the scrambling circuit to generate scrambled control codes based on the control data, wherein the control data has a first number of bits, and the scrambler circuit is to generate the scrambled control codes by:
  generating, based on the control data and a bit sequence representing the multimedia channel, expanded control codes having a second number of bits that are greater than the first number of bits, and
  generating the scrambled control codes based on the expanded control codes and the random numbers;
 an encoder circuit to generate transition minimized control codes for transmission via the multimedia channel based on the scrambled control codes; and
 a randomizer reset circuit to generate a transition maximized reset code for transmission via the multimedia channel for synchronization of the random number generator with a remote random number generator.

2. The device of claim 1, wherein the encoding circuit generates the transition minimized control codes further based on a disparity value indicating a disparity between a number of 0's and number of 1's transmitted in one or more previous transition minimized control codes.

3. The device of claim 1, wherein the encoder circuit generates the transition minimized codes by selecting the transition minimized codes from a plurality of pre-determined transition minimized codes.

4. The device of claim 1, wherein the control data corresponds to display synchronization information.

5. The device of claim 1, wherein the control data describes the multimedia data that is to follow the control data.

6. The device of claim 1, wherein:
 in a first mode the device transmits the transition minimized codes via the multimedia channel, and
 in a second mode the device transmits transition maximized versions of the control data via the multimedia channel.

7. The device of claim 6, wherein the device is set to either the first mode or the second mode responsive to a determination by the device that a sink interface to which the device is transmitting multimedia data is capable of receiving transition minimized codes, wherein this determination is made via communications preformed with the sink interface via a display data channel.

8. A device for communications over a multimedia communication interface having a plurality of multimedia channels, comprising:
 a random number generator to generate random numbers;
 a decoder circuit to decode transition minimized control codes received via a multimedia channel of the plurality of multimedia channels of the multimedia communication interface, the decoding circuit to decode the transition minimized control codes to generate scrambled control codes based on the transition minimized control codes;
 a de-scrambler circuit to generate control data associated with multimedia data to be transmitted over the multimedia channel based on the scrambled control codes and the random numbers, wherein the de-scrambler circuit is to generate the control data by:
  de-scrambling at least a portion of the scrambled control codes into intermediate control codes having a first number of bits, and
  generating the control data having a second number of bits less than the first number of bits based on the intermediate control codes; and
 a randomizer reset circuit to detect a transition maximized reset code received via the multimedia channel of the multimedia communication interface, the random number generator being reset responsive to detection of the transition maximized reset code.

9. The device of claim 8, wherein the decoder circuit generates the scrambled control codes by referencing the transition minimized control codes to a look up table that includes a plurality of pre-determined transition minimized control codes.

10. The device of claim 8, wherein the control data corresponds to display synchronization information.

11. The device of claim 8, wherein the control data describes the multimedia data that is to follow the control codes.

12. The device of claim 8, wherein the transition minimized codes are received in a first mode, and wherein, in a second mode, the device receives transition maximized versions of the control data via the multimedia channel and decodes and de-scrambles the transition maximized versions of the control data.

13. The device of claim 12, wherein the device communicates an indication via a display data channel that the device is capable of receiving transition minimized codes to a source device from which the multimedia data is being received, wherein the source device is configured to transmit transition minimized codes responsive to this indication.

14. A non-transitory computer readable medium storing a representation of a device for communications over of a multimedia communication interface having a plurality of multimedia channels, the device comprising:

a random number generator to generate random numbers;
a scrambler circuit to receive control data associated with multimedia data to be transmitted over a multimedia channel of the plurality of multimedia channels of the multimedia communication interface, the scrambling circuit to generate scrambled control codes based on the control data, wherein the control data has a first number of bits, and the scrambler circuit is to generate the scrambled control codes by:
   generating, based on the control data and a bit sequence representing the multimedia channel, expanded control codes having a second number of bits that are greater than the first number of bits, and
   generating the scrambled control codes based on the expanded control codes and the random numbers;
an encoder circuit to generate transition minimized control codes for transmission via the multimedia channel based on the scrambled control codes; and
a randomizer reset circuit to generate a transition maximized reset code for transmission via the multimedia channel for synchronization of the random number generator with a remote random number generator.

15. A non-transitory computer readable medium storing a representation of a device for communications over a multimedia communication interface having a plurality of multimedia channels, the device comprising:

a random number generator to generate random numbers;
a decoder circuit to decode transition minimized control codes received via a multimedia channel of the plurality of multimedia channels of the multimedia communication interface, the decoding circuit to decode the transition minimized control codes to generate scrambled control codes based on the transition minimized control codes;
a de-scrambler circuit to generate control data associated with multimedia data to be transmitted over the multimedia channel based on the scrambled control codes and the random numbers, wherein the de-scrambler circuit is to generate the control data by:
   de-scrambling at least a portion of the scrambled control codes into intermediate control codes having a first number of bits, and
   generating the control data having a second number of bits less than the first number of bits based on the intermediate control codes; and
a randomizer reset circuit to detect a transition maximized reset code received via the multimedia channel of the multimedia communication interface, the random number generator being reset responsive to detection of the transition maximized reset code.

* * * * *